United States Patent
Kim et al.

(10) Patent No.: US 6,837,099 B2
(45) Date of Patent: Jan. 4, 2005

(54) POWER TEST FACILITY SYSTEM OF TRAIN AND TESTING METHOD OF THE SAME

(75) Inventors: Bong-Taek Kim, Songpa-gu (KR); Hyo-Sang Kim, Songpa-gu (KR)

(73) Assignee: Shalom Engineering Co., Ltd., Seoul (KR)

(*) Notice: Subject to any disclaimer, the term of this patent is extended or adjusted under 35 U.S.C. 154(b) by 0 days.

(21) Appl. No.: 10/665,135

(22) Filed: Sep. 16, 2003

(65) Prior Publication Data

US 2004/0163451 A1 Aug. 26, 2004

(30) Foreign Application Priority Data

Feb. 21, 2003 (KR) .............................. 10-2003-0011017

(51) Int. Cl.[7] .......................................... G01M 17/08
(52) U.S. Cl. ............................................. 73/112
(58) Field of Search .................... 73/112, 115, 116, 73/117.1, 117.2, 117.3, 118.1, 865.6

(56) References Cited

U.S. PATENT DOCUMENTS

| | | | | |
|---|---|---|---|---|
| 4,671,106 A | * | 6/1987 | Schroeder .................. | 73/117.3 |
| 4,718,271 A | * | 1/1988 | Garland ...................... | 73/116 |
| 5,623,104 A | * | 4/1997 | Suga ....................... | 73/862.18 |
| 5,767,402 A | * | 6/1998 | Sandlass et al. ............. | 73/779 |
| 6,618,229 B2 | * | 9/2003 | Bax ........................... | 361/42 |

FOREIGN PATENT DOCUMENTS

KP    10-0317558    12/2001

* cited by examiner

Primary Examiner—Eric S. McCall
(74) Attorney, Agent, or Firm—Jordan and Hamburg LLP (57) ABSTRACT

The present invention relates to a power testing facility system of a train and a testing method using the same. In the present invention, there are provided a test bed for engaging a testing object, a DC power facility formed of a converter transformer and DC power converter, an AC power facility formed of a phase balancing apparatus, a voltage regulating transformer, and a power factor improving apparatus, a load facility formed of an induction generator and a bi-directional inverter, a measuring apparatus for measuring various characteristics of a propulsion apparatus, and a control apparatus for controlling the entire system. With the above elements, it is possible to implement a type test, a combination test and a train operation simulation test using a facility system adapted to test a power of a train. When selecting an instrument installed in a train, it is implement a desired reliability by testing a previously fabricated product. The facility is economically operated, and an operation cost is minimized. An easier maintenance is implemented. An electrical energy may be restored using a bi-directional inverter. A power loss is decreased. It is possible to prevent an indoor temperature increase.

12 Claims, 8 Drawing Sheets

POWER TEST FACILITY SYSTEM OF TRAIN AND TESTING METHOD OF THE SAME

BACKGROUND OF THE INVENTION

1. Field of the Invention

The present invention relates to a power test facility system of a train and a testing method of the same.

2. Description of the Background Art

In an electric motor used in a conventional electric train system, a direct current motor having a good starting torque is mainly used. However, since a lifespan of a segment contact point is short, the direct current motor is frequently exchanged. In order to overcome the above problem, an induction motor is used. However, the induction motor has a problem that a starting torque is bad. Generally since a weight occurring in a train connection is higher than an average weight, it is impossible to implement an enough traction power based on only a starting force of an induction motor.

In order to overcome the above problems, a three-phase motor is used. Namely, an inverter is used for a direct current section, and a VVVF CI(Responsive Voltage Responsive Frequency Converter Inverter) is used in an alternating section. A propulsion apparatus is controlled by varying a voltage and frequency.

In the present invention, a propulsion apparatus of a train represents the construction combined with one converter/inverter and two or four traction motors. The train is formed of a M(Motor) car and a T(Trailer) car. A propulsion apparatus is provided in only the M car. The load facility represents a facility for combining a loader inverter and an induction generator.

In order to periodically test whether an instrument power such as a traction power and a breaking power is properly performed during an operation of a propulsion apparatus, a certain test facility is needed for thereby stably and accurately testing an operation of a train.

However, since there is not provided a facility for systematically and accurately testing such a propulsion apparatus in the conventional art, an inverter and a traction motor are separately tested. In addition, the above test is performed using a fixed load facility, so that a reliability with respect to an instrument performance test is bad. In addition, an estimation possibility with respect to a safety and adaptability during an operation of a facility is low, so that various problems may occur.

For example, in the case of a traction motor, since a tested device(device under test) is continuously rotated and is tested by forming an inertia force using a resistance load, an accuracy is decreased. In addition, in the case that a traction inverter is tested, since a load facility is fixed, the test may be performed, not considering a varying real time information such as a train information, track information, etc. which are expected in an actual train section, so that a reliability is decreased with respect to a test result.

Figure 1:
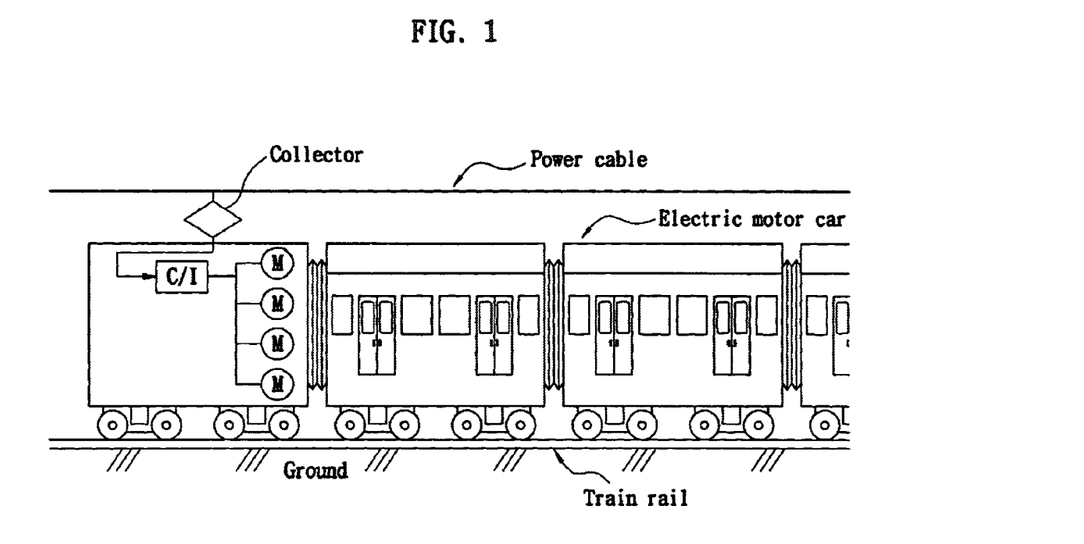
FIG. 1 is a view illustrating an arrangement of instruments installed in a train.

FIG. 1 is a view illustrating an arrangement of elements provided in a train. As shown therein, there is provided a propulsion apparatus which is adapted to rotate four wheels provided in a lower portion of an electric rail car as a power is supplied to an electric rail car(here, referred to one car of a train).

The power is supplied to a propulsion apparatus by a collector(Pantograph) through a power cable. The power supplied to the propulsion apparatus is DC 750V~1500V in the direct current section, and AC 25,000V in the alternating current section. However, the above standard may be changed based on the standards of each country.

Generally, one convertertinverter(C/I) and two or fourth three-phase AC motor are connected to one car. The capacity of the motor is 300KW, 1100KW. W/hen the power is supplied to the train, the DC is changed into the AC through the inverter in the DC section, so that the power is supplied to the AC motor for thereby driving the motor. The wheels of the train are driven by the propulsion power from the motor. In the AC section, the power of 25000V is changed to the DC for thereby dropping the voltage, and the DC is changed into the AC by the inverter for thereby driving the motor.

Before an inverter, converter, motor or generator are installed in an electric rail car, researches are performed for testing the performance based on various methods with respect to the above elements in a certain research center or test institute. For example, the performance of the inverter is measured in the type test, and in the combination test, the converter/inverter is combined with the traction motor for thereby testing a traction power. The load inverter and induction generator are combined, and a load force is tested. In the case of the train operation simulation test, the propulsion apparatus is installed in the train, and a train information and track information are inputted for measuring the power when the trains runs on an actual track. A resistance force is computed in real time and operates as a load with respect to the traction power of the propulsion apparatus. The speed of the train, an acceleration, traction power and breaking power are measured.

In the Korean patent registration publication No. 10-0317558(Publication date: Dec. 24, 2001, applicant: Korea rail road research center) "Power test control method and apparatus for test operation", it is possible to enhance a reliability of a power test during a train test operation in such a manner that a data related to a railroad car test operation test item is simply and conveniently measured and analyzed using a computer.

However, the above invention is basically directed to test-operating the train and testing an operation of the train. The above invention does not disclose a technology concerning a facility system with respect to the power test for the instruments provided in the train.

In particular, in the conventional art, it is impossible to perform a combination test of a converter and inverter and a traction motor, a combination test of a load inverter and an induction test and a train operation simulation test based on a train information, track information and load. In addition, it is impossible to systemically perform a power test of a train because there is not provided a test facility which is capable of quickly and accurately testing the power of a converter, inverter, motor or generator which is installed in various kinds of trains such as a DC electric rail car, DC light electric train, G& high speed electric train, and KTX high speed electric train.

SUMMARY OF THE INVENTION

Accordingly, it is an object of the present invention to provide a train operation simulation test by a real time simulation software which is capable of implementing a type test of an inverter installed in a train, a combination test of a converter and inverter and a traction motor, and a combination test of a load inverter and an induction generator and is capable of inputting a train information, track information, etc. which are expected in a certain rain and railway section.

Namely, in the case of a train operation simulation test, a propulsion apparatus is installed in a train. A train information and track information are simulately inputted for computing a resistance force in real time and applying a traction force of a propulsion apparatus which is a tested apparatus for thereby measuring a speed, acceleration, traction force and braking force of a train which runs on an actual rail road. Therefore, it is possible to measure a velocity, acceleration, traction force and braking force of a train which runs on an actual rail. In the present invention, it is possible to implement a train operation simulation under the same condition as when a train runs, in a load facility based on a train information which is obtained when a train actually runs a rail and a circumference that a passenger is on the train.

It is further another object of the present invention to provide a system and testing method capable of fast and accurately testing various kinds of inverters, converter, motor and generator attached to a DC electric rail car, DC light weight electric train(LRV), G7 high speed electric train, and KTX high speed electric train(TGV).

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 2:
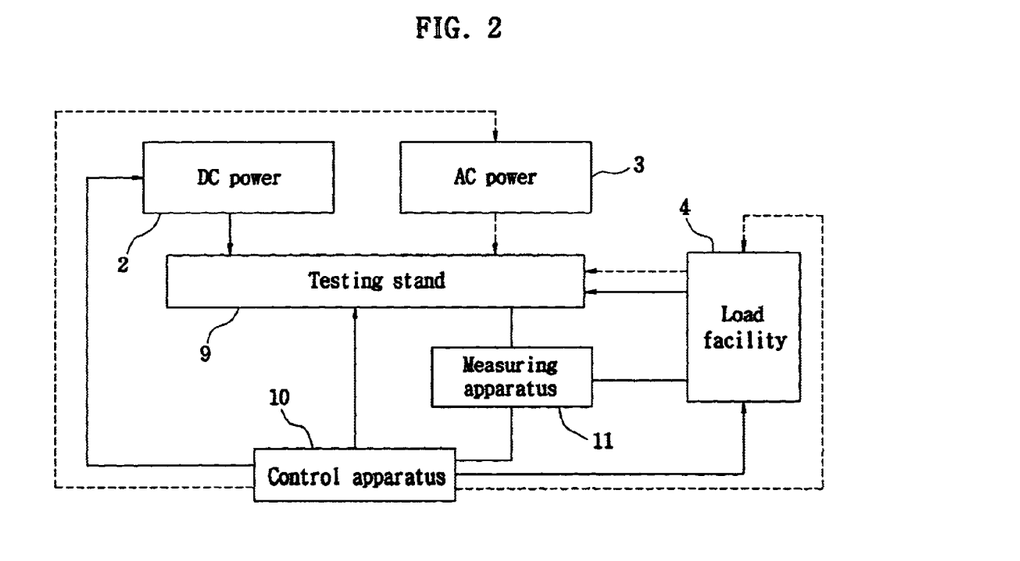
FIG. 2 is a block diagram of an engaging relationship of the elements of a test facility system.

The present invention relates to a power test facility system of a train and a testing method using the same. FIG. 2 is a block diagram illustrating the construction of a power test facility system. As shown therein, a facility system is formed of a test bed 9 for engaging a test object, a DC power facility 2 for supplying a power, an AC power facility 3, a load facility 4 which provides an imaginary load of a train, a measuring apparatus 11 for measuring various characteristic, and a control apparatus 10 for controlling the system. The measuring apparatus is connected with the test bed 9, the load facility 4 and the control apparatus.

In the present invention, the test object means an inverter, a converter, a motor, a generator and related electric instruments. In addition, in the present invention, it is possible to test various electric instruments such as a generator, a motor, an inverter, a converter and other rotation instruments which are generally used in an industrial field using a power test facility system according to the present invention.

However, in the present invention, only the power test with respect to an inverter, a converter, a motor and a generator which are engaged to a train will be described at the best type.

(i) Power Test of Train Which Runs in a DC Section

In the case that the power of the train which runs in a DC section is tested, the present invention is implemented based on the elements which are indicated by the solid line in the drawing. At this time, the AC power facility is not connected. Here, the power test of the train is performed in such a manner that the DC power facility 2, and the control apparatus 10 the load facility 4 are connected about the test bed 9, and the control apparatus 10, the DC power facility and the load facility 4 are connected in series.

(ii) Power Test of Train Which Runs in an AC Section

In the case that the power of the train which runs in an AC section is tested, the present invention is implemented based on the elements indicated by the dotted line in the drawing. At this time, the DC power facility is not connected. Namely, the AC power facility 3, the control apparatus 10 and the load facility 4 are connected about the test bed, and the control apparatus 101, the AC power facility 3 and the load facility 4 are connected in series for thereby performing a power test of the train.

In addition, a traction motor is rotated in a normal direction by a traction power generated by the inverter which is a tested unit, and an induction generator is rotated in a reverse direction by a speed control signal in accordance with a command of the control apparatus, for thereby generating a load force.

The load inverter of the load facility is a bi-directional inverter, and operates as a generator when the propulsion apparatus is operated in a reverse direction, and a power which is generated based on a difference between the traction power of the traction motor and a load force which occurs in the induction generator rotating in the reverse direction, to the power facility through the load inverter for thereby restoring an electrical energy, and when braking the propulsion apparatus, the load inverter of the same operates a motor, so that an electrical energy of the power facility is used as a driving force which generates a load force.

The above load facility is implemented assuming that passenger is in the train.

The measuring apparatus 11 is formed of a power meter for measuring an output power of a tested inverter, a temperature meter for measuring the temperatures of an inverter, a converter, a traction motor and an induction generator which are the tested elements, a driving force meter for measuring a torque and revolution which occur in a rotary shaft connecting the traction motor and the induction generator, and a standard signal processor for processing the measuring result of the power meter and the measuring result of the driving force meter are connected in series.

In the control apparatus 10, a personal computer(PC) and PLC are connected in series, and a traction power command signal is transmitted to the inverter which is a tested unit, and a load force command signal is transmitted to the load inverter based on a result of the measurement of the standard signal processor.

The power test method of the train according to the present invention may be classified into three methods. First, the type test is performed with respect to the inverter using the power test facility system. Second, the converter and inverter and the traction motor are combined, so that a combination test is performed. In addition, the combination test is performed by combining the load inverter and the induction generator.

Third, the operation simulation test of the train is performed based on a real time simulation software which is capable of inputting a train information and a track information by combining the converter and inverter and the traction motor. The above tests will be described in detail.

(i) Type Test of Inverter

The power of the inverter is measured, and a cooling, a code function and measurement instrument test, a power transformer control function test, a light load test, a temperature up test, and a lower fast change test are performed.

(ii) Combination Test

In the combination test of the converter and inverter and the traction motor, a temperature up test, a torque characteristic test(reverse direction, braking), an efficient characteristic test, a parallel operation test, a protection system test, and a wheel slip(slide) simulation test are performed.

In the combination test of the load inverter and the induction generator, a temperature up test, a torque test, an efficient characteristic test, a parallel operation test, and a protection system test are performed.

The method of the type test and combination test includes the steps of a step for connecting a tested unit, a peripheral, a power apparatus and a load apparatus; a step for connecting a control facility and the tested unit; a step for selecting an operation type switch in normal; a step for connecting the tested unit a recording meter with the measuring point, and setting an input rated voltage; a step for setting a load inverter and selecting a responsive load; a step for driving the tested unit and selecting a notch; a step for selecting a braking power and operating the tested unit; a step for measuring a breaking force, a waveform and output of each measuring point; and a step for judging and outputting a result and completing the test.

(iii) Train Operation Simulation Test

The train operation simulation test are formed of a real time operation simulation test, a temperature up test based on an operation pattern, a protection apparatus operation test for an accident, and an interface test between major instruments. An inverter used for the combination test and the operation simulation test is a bi-directional inverter.

The train simulation test method includes a step in which it is judged whether a conventional scenario is used with respect to a test or a new scenario is used, and when a new scenario is formed, a test train car is selected, and a train car condition and track are selected; a step for forming a scenario by setting a test event and a test method and storing the formed scenario; a simulation step in which when a conventional scenario is used without newly forming a scenario, a certain scenario is selected, and a test is started; a step in which whether or not an auto operation is used is judged, in the case of the auto operation, an auto simulation is performed, and when the auto operation is not selected, a master controller key is operated; a step in which a dynamic simulation is performed through a pulse width modulator (PWM); a step for controlling a load unit; a step in which it is judged whether a test end is or not, and in the case of the test end, a test result is valuated, and a report is formed, and in the case that the test is not ended, a test result is stored, and the routine is fed back to a signal simulation by monitoring; and a step in which a test report is valuated, and whether or not a retest is performed is judged, and when the report is satisfied, a system is ended, and when the report is not satisfied, it is judged whether or not the simulation test is performed, and the routine is fed back to the first step, and a scenario is formed for thereby starting a test.

The dynamic simulation includes the steps of: a step for inputting and storing a traction force characteristic of a train propulsion apparatus and a computation formula of a train running resistance; a step for initializing a velocity and position of a train; a step in which an initialization state is judged, when the initialization is performed, a state of a train such as a position and velocity of a train is read; a step for computing a train resistance using a slope and curve of a running track of a train; a step for inputting a traction power, braking power and command and computing the same; a step for computing a revolution and angle; and a step for storing a velocity and position data of a train and transferring to the load controller.

Most Preferred Embodiment of the Present Invention

The technical construction and operation of the present invention will be described with reference to the accompanying drawings.

Figure 3:
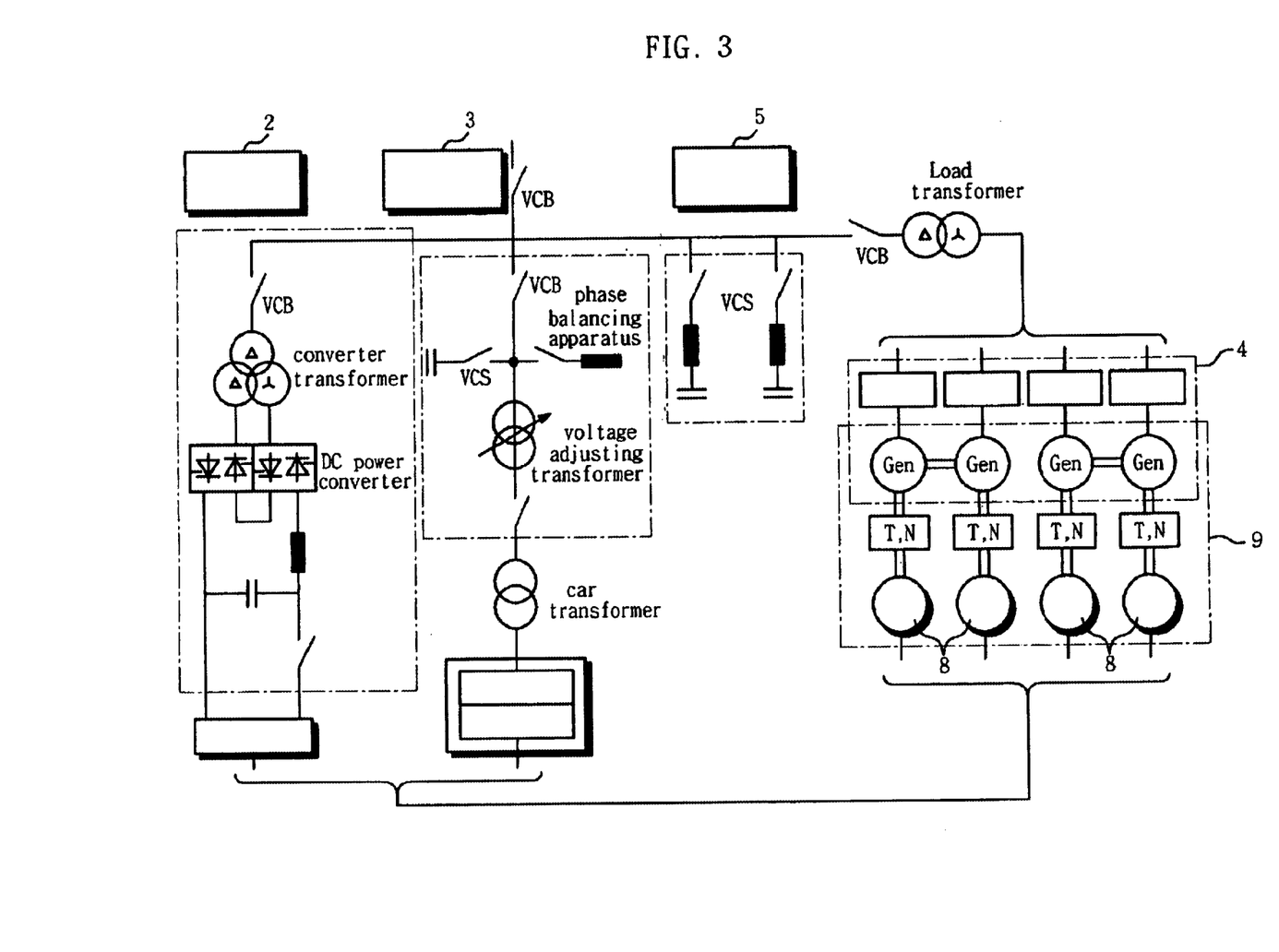
FIG. 3 is a detailed view illustrating a power test facility system of a train according to the present invention.
Figure 4:
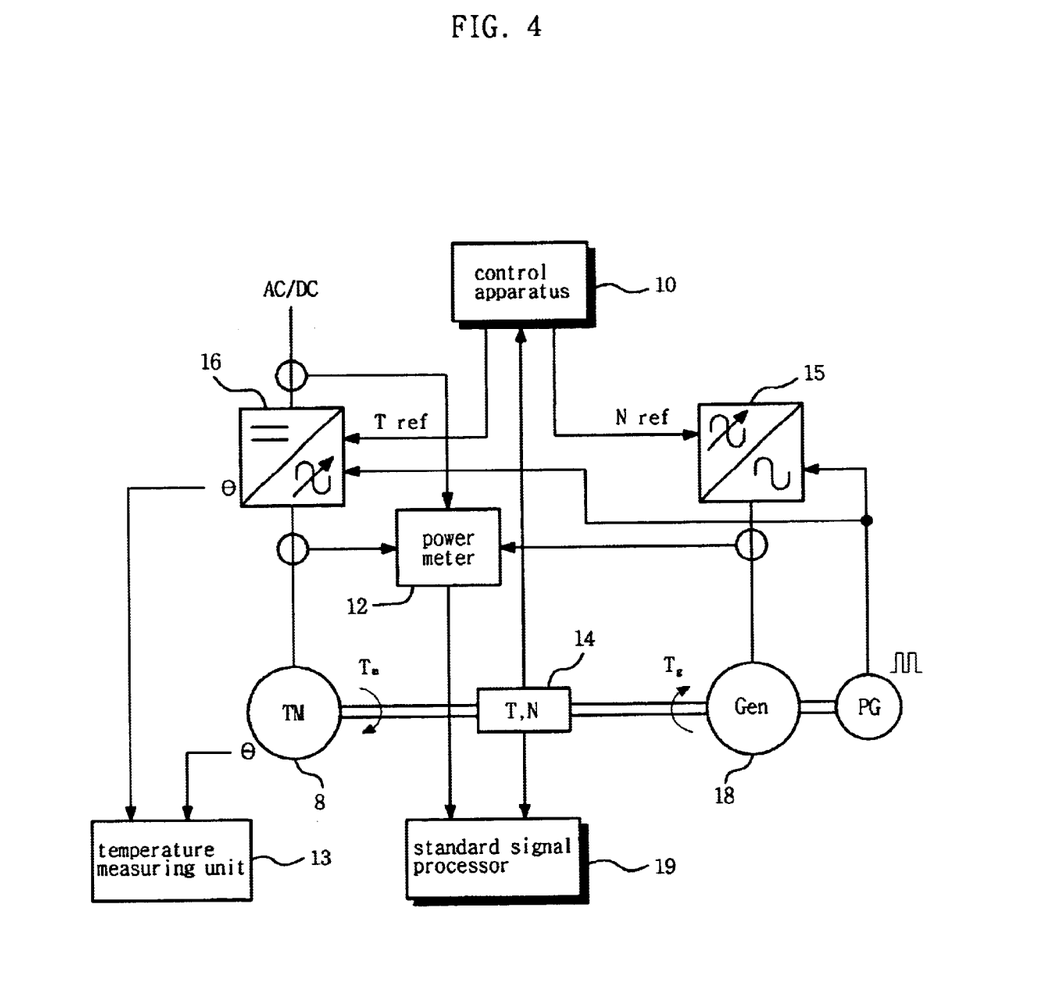
FIG. 4 is a block diagram of a type test and a combination test of a train.
Figure 5:
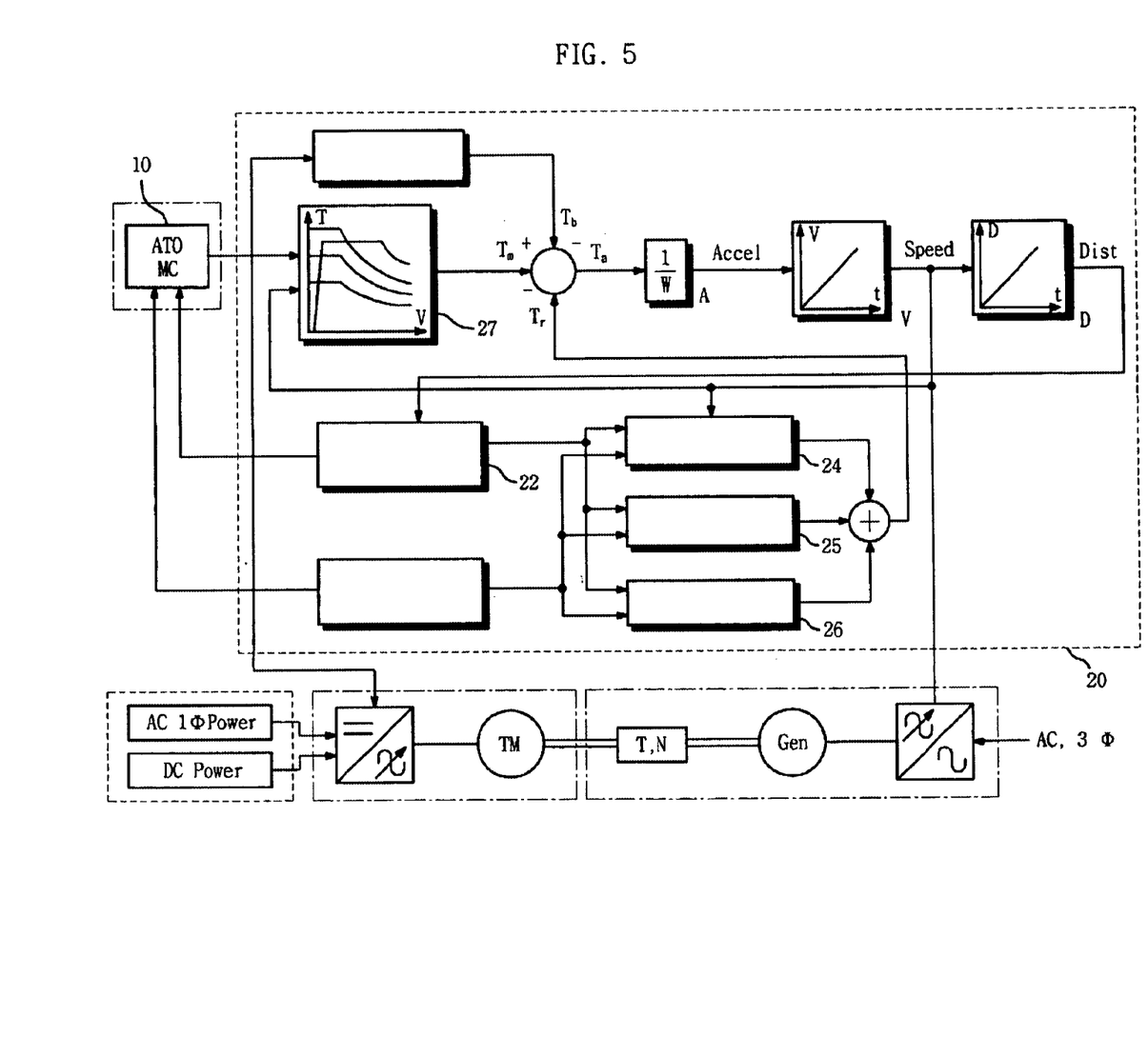
FIG. 5 is a block diagram of a test facility of a train operation simulation.
Figure 6:
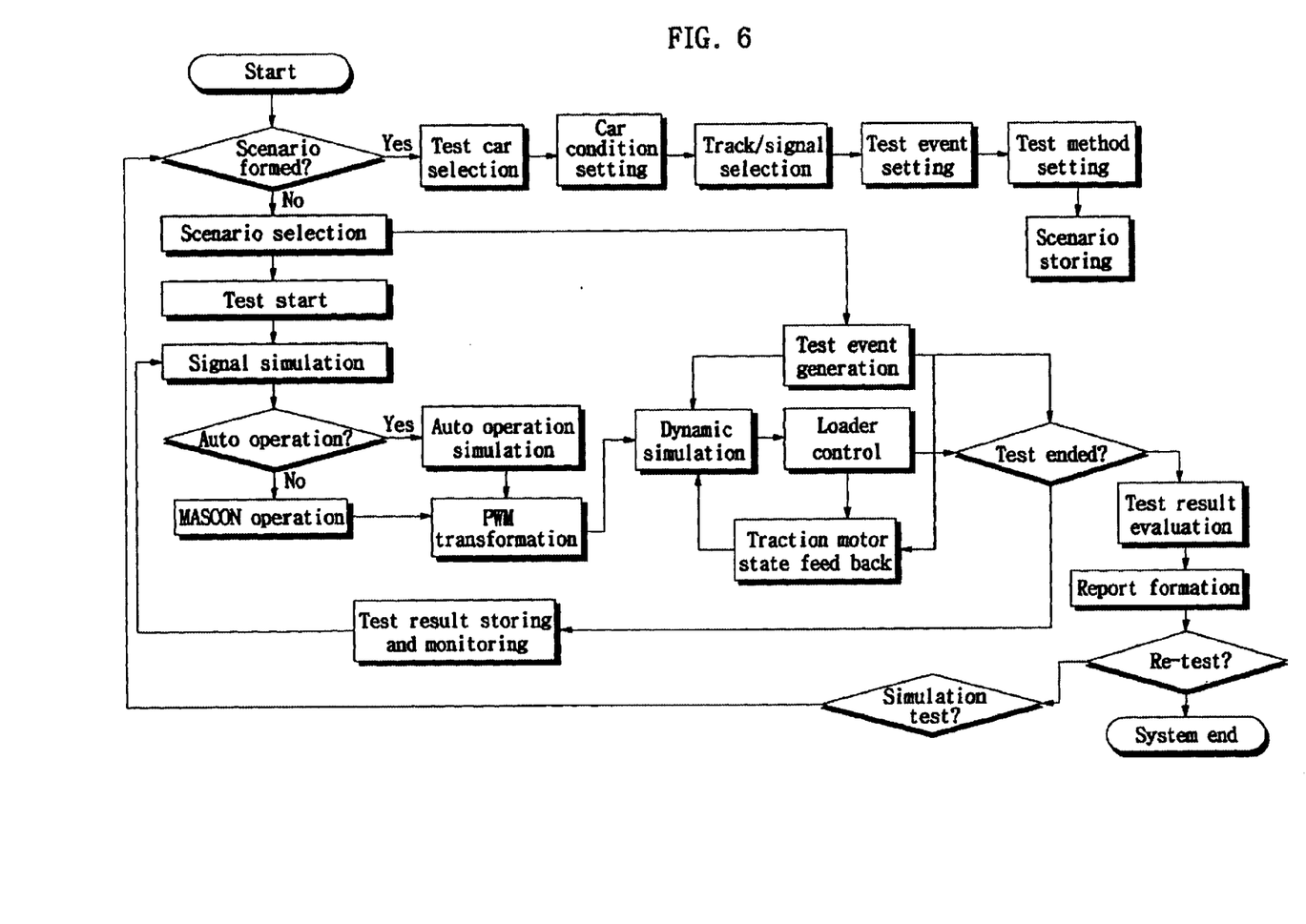
FIG. 6 is a flow chart of a test method of a train operation simulation.
Figure 7:
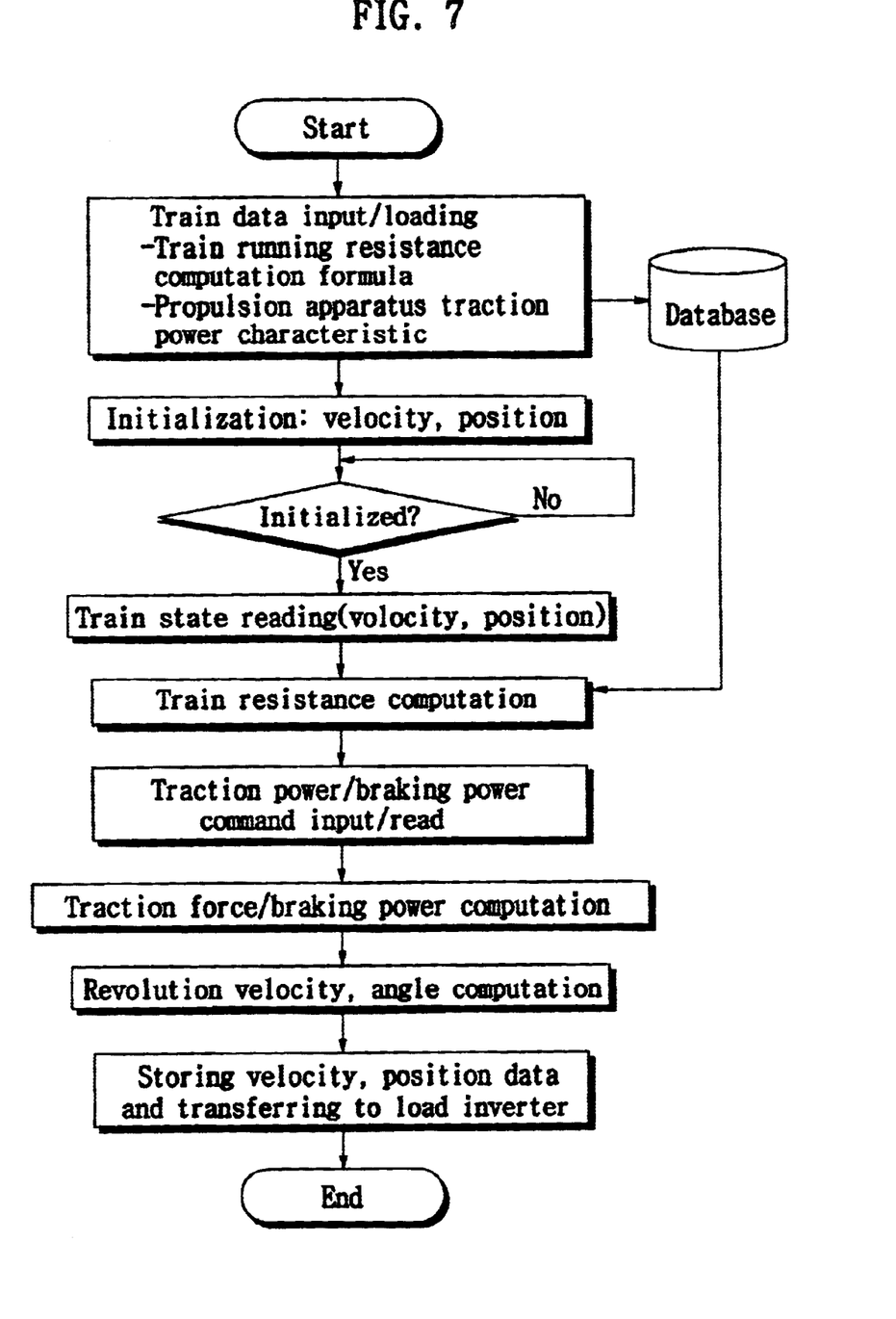
FIG. 7 is a flow chart illustrating a dynamic simulation of FIG. 6.
Figure 8:
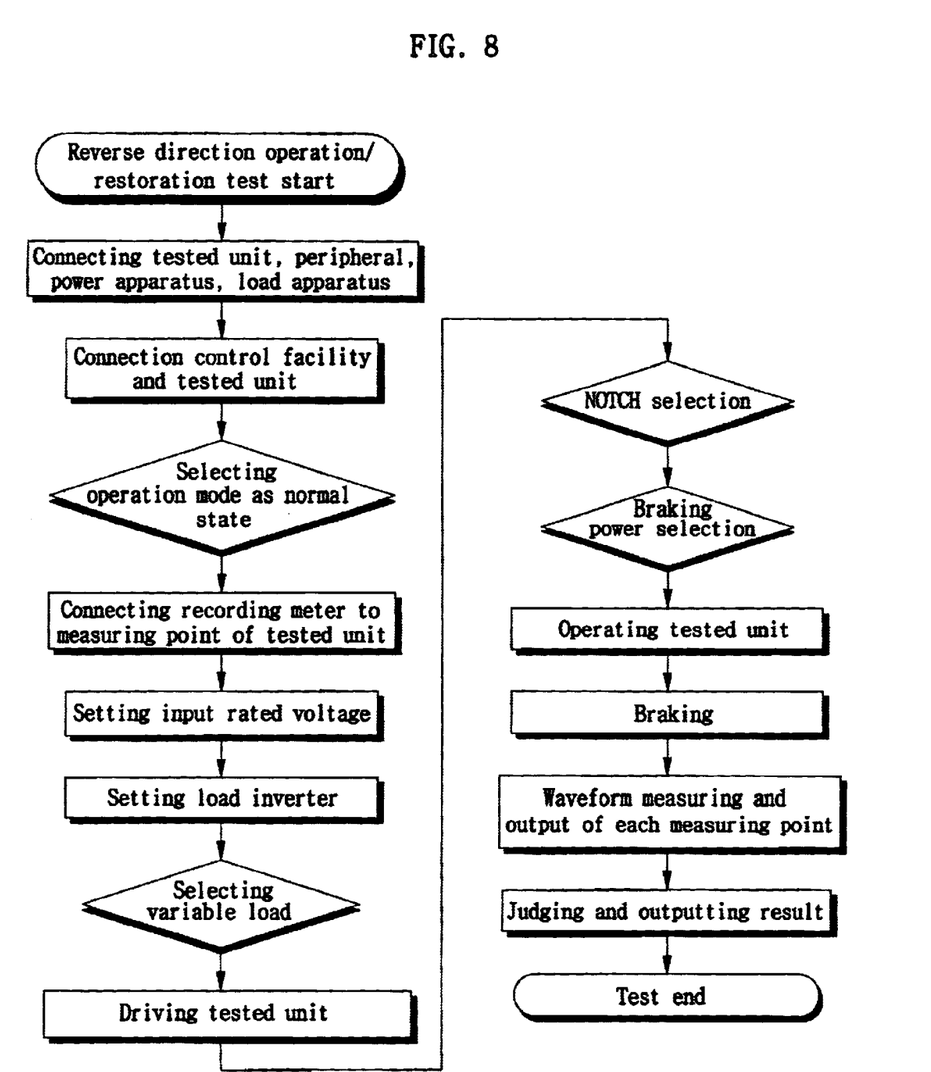
FIG. 8 is a flowchart illustrating a procedure of a type test and a combination test.

FIG. 3 is a detailed view illustrating a power test facility system of a train according to the present invention, FIG. 4 is a block diagram of a type test and a combination test of a train, FIG. 5 is a block diagram of a test facility of a train operation simulation, FIG. 6 is a flow chart of a test method of a train operation simulation, FIG. 7 is a flow chart illustrating a dynamic simulation of FIG. 6, and FIG. 8 is a flowchart illustrating a procedure of a type test and a combination test.

FIG. 3 is a view which embodies the construction of FIG. 2 and shows the construction of a facility system for testing a power of a train according to the present invention. As shown therein, As shown in FIG. 1, the test facility system of a train includes a test bed 9 for engaging a propulsion apparatus which is a tested unit, a DC power facility 2 formed of a converter transformer and DC power converter, an AC power facility 3 formed of a phase balancer, a voltage adjusting transformer, and a power factor improving apparatus 5, an AC power facility 4 formed of a voltage regulating transformer, and a power factor improving apparatus 5, a load facility 4 formed of an induction generator and a bi-directional inverter, a measuring apparatus 11 for measuring various characteristics of a propulsion apparatus, and a control apparatus for controlling the entire system. The phase balancer is adapted to maintaining a balance of a phase. The power supplied to the AC power facility is AC25000V. This may be changed based on the power state of the installation place.

In the technical construction of the test facility system related with the load facility, as shown in a lower side of FIG. 5, the inverter 16 which is a tested element, the traction motor 8, the driving force measuring unit 14, the induction generator 18 and the load inverter 15 are connected in series. In the operation procedure, the traction motor 8 is rotated in the normal direction by a traction force(T ref: Torque reference) generated by the inverter 16 which a tested element, and the induction generator 18 generates a load force in the reverse direction based on a speed control signal by the command of the control facility, so that the power measuring unit 14 measures the torque and the revolution (RPM).

In the present invention, the load inverter 15 uses a bi-directional inverter which is one of the major elements of the present invention. In the present invention, since the above bi-directional inverter is used, it is possible to compute the power of the traction motor and to uses the same as a load, without restoring the energy. Namely, the thusly computed power is used as a load which occurs based on a difference between the traction power of the traction motor and a load force of the induction generator which is rotated in a reverse direction and is used for restore the electric energy by feeding back to the power apparatus, so that it is possible to save an energy and decrease a heat occurrence for thereby limiting an increase of temperature.

In addition, the load facility may be formed in two pairs or four pairs. If necessary, the load facility may be formed in the even pairs using a certain number of the same.

In the present invention, the inverter, induction generator and traction motor are placed on the test bed 9 for thereby being tested. A DC motor, single phase induction motor or three phase motor may be used for the traction motor. In the present invention, the three phase induction motor is used in the embodiment of the present invention.

The measuring method based on the test with respect to the performance of the instruments installed in the DC section and AC section will be described with reference to FIG. 3.

(i) Measuring Method in the DC Section

In the method for testing in the DC section and measuring the result, the control apparatus commands a voltage level to the DC power facility, and the DC power facility supplies a DC power to the test bed. In addition, the control apparatus commands a load inertia value to the load facility, and the load facility provides a virtual information to the test bed.

When the control apparatus commands a notch signal (namely, traction force signal) to the test bed, a traction force occurs in the tested measuring equipment of the test bed, and the measuring apparatus displays a result of the test.

(ii) Measuring Method in the AC Section

In the method for testing in the AC section and measuring the result, the control apparatus commands a voltage level to the AC power facility, and transmits a control signal to the load facility and the test bed. A traction force is generated in the normal direction in the propulsion apparatus provided in the test bed, and the measuring apparatus displays a result of the test.

Power Test Result Measurement of Train

The principle for measuring a result of the power test of the train will be described in detail.

The notch signal(traction power signal) applied to the test bed in the control apparatus corresponds to a traction power(Fm) based on the torque of the motor corresponding to a propulsion power. The load inertia value is adapted to generating a load force(Fg) by applying a load to the train car. In particular, the test is implemented based on an imaginary train car, the setting of the load inertia value is implemented based on the imaginary information on a train car weight, a passenger weight, a weather state, a railway state, etc.

Namely, F=M*A(power=mass*acceleration(train speed), wherein the testing is performed by providing the load facility corresponding to the mass. Namely, the simulation test is performed by applying an imaginary load(mass) to the propulsion apparatus which is a tested object.

In the traction motor of the propulsion apparatus, the traction power(Fm) s generated in the normal direction, and the load force(Fg) is generated in the reverse direction in the induction generator of the load facility.

The actual propulsion power F is Fm−Fg=M*A(where M represents a load inertia value, the acceleration "A" is generated based on F).

When integrating the acceleration "A", namely, ∫a=v (velocity), ∫v=d(distance). Therefore, when testing the propulsion apparatus, it is possible to compute the velocity, acceleration, distance and etc. of the train. In addition, it is possible to estimate how fast the train runs, the next time and speed, distance, etc. It is possible to variously perform the test based on the multiple views of the power of the propulsion apparatus. The result is readable through a gauge board of the measuring apparatus.

FIG. 4 is a block diagram with respect to a combination test of the converter and inverter and the traction moor and a combination test of the load inverter and the induction generator.

The control apparatus 10 is formed of a personal computer(PC), and a programmable logic controller. The control apparatus 10 sets an output of a power facility. When a traction power command signal(T ref) is transferred to the tested inverter 16, the traction power TM is generated in the normal direction in the traction motor 8 by the traction force. When a reference speed value which is a load force command signal(N ref) is transferred to the load inverter 15 based on a measuring result of the standard signal processor 19, the induction generator 18 is rotated(Tg) in the reverse direction. The above operation may be a load which limits the rotational force of the traction motor. In this case, the difference of the rotational force(Tm−Tg=T) is generated as a velocity of the train and a certain power.

The measuring apparatus 11 for measuring various characteristics of each facility related to the operation of the control apparatus 10 includes a power meter 12 for measuring an output power of a tested inverter 16, a temperature meter 13 for measuring the temperatures of the tested inverter 16, the traction motor 8, and the induction generator 18, a power measuring meter 14 for measuring the torque and revolution which occur in the shaft connecting the traction motor and the induction generator, and a standard signal processor 11 for processing a measuring result of the power meter 14.

FIG. 5 is a block diagram of a train operation simulation test facility system. As shown in FIG. 5, a traction power occurs in the tested inverter and the traction motor for a train operation simulation test. A velocity occurs in the load facility which is formed of the induction generator and the load inverter. The torque and revolution(RPM) of a rotary shaft are measured by the power measuring meter.

Imaging a certain section in which a train runs, a track and route data 22 such as a slope, curve, tunnel, signal, track/signal data of a corresponding section, and a train information such as a weight of a train are computed based on the movement resistance 24(Rr=a+bV+cV²/W), a slope resistance 25(Rg=±n) and a curve resistance 26(Rc=K/r), and the thusly computed values are summed and then summed(Ta) again with the brake typel characteristic Tb and the traction typel 27 Tm. The power for the speed of the train is obtained by multiplying the acceleration A with the weight of the train, namely, F=M*A.

When integrating the acceleration, a velocity is obtained. When integrating the velocity, a distance is obtained. Therefore, there is provided a simulation software 20 which computes based on an algorithm made with various characteristics in a certain train running section using a mathematical computation principle and inputs an information in real time. In addition, the control apparatus 10 generates a traction force(T ref: torque reference), and a notch is operated based on an information whether an automatic operation apparatus(ATO) or a manual operation(MASCON) is implemented.

The method for testing the power of a train using a test facility system includes a step for a type test with respect to an inverter, a step for a combination test performed by combining a converter and inverter and a traction motor, a step for a combination test performed by combining a load inverter and an induction generator, and a step in which the converter and inverter and the traction motor are combined, and the load inverter and induction generator are combined, and an operation simulation test is performed by inputting a train information and track information which are obtained by imaging a certain load of a condition such as a train operation into a computer program.

The above test method may be implemented by selecting one of the them or by combining at least two test methods. For example, the type test, the combination test and the operation simulation test of a train may be combined each other.

The operation test of the train may be preferably performed in a research center or a test institute which has the above test facilities. In addition, since there are the DC or AC in the power facility in the train operation section, assuming the DC section and the AC section, the type test, the combination test of the converter and inverter and the traction motor, the combination test of the load inverter and the induction generator, and the train operation simulation test are performed.

The method for implementing the test using the power test facility system according to the present invention will be described. FIG. 6 is a flow chart of a test method of a train operation simulation, and FIG. 7 is a flow chart illustrating a dynamic simulation of FIG. 6.

FIG. 6 is a flow chart of a test method of a train operation simulation.

The testing method of the train operation simulation method includes a step in which it is judged whether a conventional scenario is used with respect to a test or a new scenario is used, and when a new scenario is formed, a test train car is selected, and a train car condition and track are selected; a step for forming a scenario by setting a test event and a test method and storing the formed scenario; a simulation step in which when a conventional scenario is used without newly forming a scenario, a certain scenario is selected, and a test is started; a step in which whether or not an auto operation is used is judged, in the case of the auto operation, an auto simulation is performed, and when the auto operation is not selected, a master controller key is operated; a step in which a dynamic simulation is performed through a pulse width modulator(PWM); a step for controlling a load unit; a step in which it is judged whether a test end is or not, and in the case of the test end, a test result is valuated, and a report is formed, and in the case that the test is not ended, a test result is stored, and the routine is fed back to a signal simulation by monitoring; and a step in which a test report is valuated, and whether or not a retest is performed is judged, and when the report is satisfied, a system is ended, and when the report is not satisfied, it is judged whether or not the simulation test is performed, and the routine is fed back to the first step, and a scenario is formed for thereby starting a test.

Here, a PWM(Pulse Width Modulator) is an apparatus for controlling a torque based on a variation of a pulse width. Namely, if the pulse width is increased, the torque is increased, and if the pulse width is decreased, the torque is decreased. In the procedure for generating a scenario among the test methods, the test event represents an event, assuming that an error occurs in a certain section. In the case that a conventional scenario is selected during the scenario selection procedure, the test is performed through multiple steps based on a signal simulation, etc. In the case that the test event is set, the routine directly goes to the test event generations step.

FIG. 7 is a flow chart of a dynamic simulation in an operation simulation test procedure of FIG. 6. As shown in FIG. 7, the dynamic simulation includes the steps of a step for inputting and storing a traction force characteristic of a train propulsion apparatus and a computation formula of a train running resistance; a step for initializing a velocity and position of a train; a step in which an initialization state is judged, when the initialization is performed, a state of a train such as a position and velocity of a train is read; a step for computing a train resistance using a slope and curve of a running track of a train; a step for inputting a traction power, braking power and command and computing the same; a step for computing a revolution and angle; and a step for storing a velocity and position data of a train and transferring to the load controller.

FIG. 8 s a flow chart of a combination test method of a type test of an inverter, a combination test of a converter and inverter and a traction motor, and a combination test method of a load inverter and an induction generator.

The train running test(in reverse direction) in the type test and combination test and the braking test(restoring test) will be described.

There are provided a step for connecting a tested unit, a peripheral, a power apparatus and a load apparatus; a step for connecting a control facility and the tested unit; a step for selecting an operation type switch in normal; a step for connecting the tested unit recording meter with the measuring point, and setting an input rated voltage; a step for setting a load inverter(reference speed, torque setting) and selecting a responsive load; a step for driving the tested unit and selecting a notch(user adjusts an acceleration and deceleration); a step for selecting a braking power and operating the tested unit; a step for measuring a breaking force, a waveform and output of each measuring point; and a step for judging and outputting a result and completing the test.

Here, as the weight of the train is changed based on the number of passenger in the train, the responsive load may be classified into the case that the passenger is fully filled in the car(full car), the case that the passenger is not filled in the car(empty car), and the case that the passenger is filled in half(half car).

What the tested unit is driven unit that the tested unit is forwardly or backwardly moved or is relayed. In addition, in the case the notch is selected, it is possible to accelerate or decelerate the velocity of the train as the user adjusts the notch.

Figure 9:
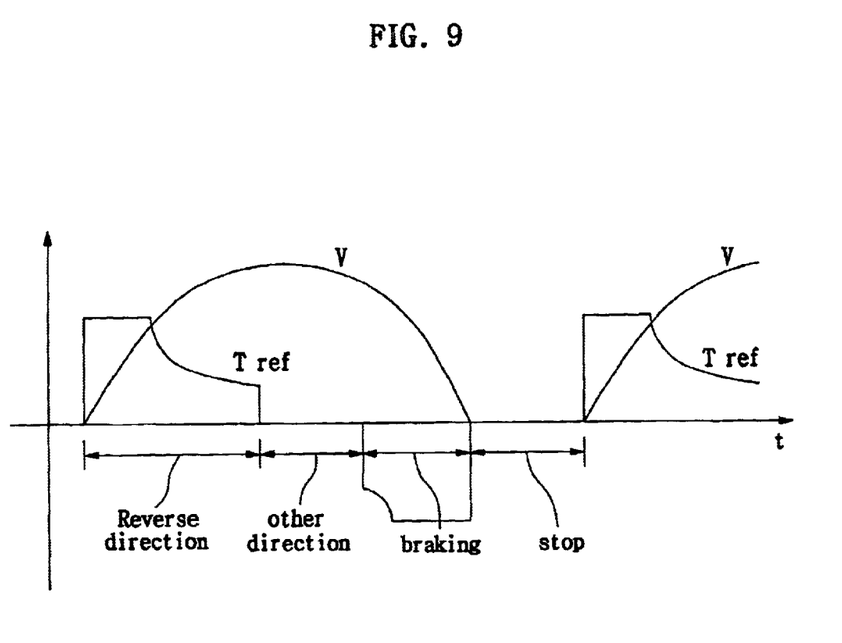
FIG. 9 is a graph of a standard operation pattern of a train.

FIG. 9 is a graph of a standard operation pattern of a train. The graph shows a state that a velocity of the train is changed with respect to the variation of the traction power of the propulsion apparatus of the train. First, when the train is driven, the traction power is sharply increased. However, the velocity is gradually increased. When the velocity has a negative value, the traction power has a minus value. Therefore, the above variation of the traction force is adjusted by the notch.

As described above, in the present invention, it is possible to implement a performance test of various kinds of electric instruments installed in a train using a power test facility according to the present invention, and it is possible to implement an international standard level which is required in the spec of the electric instruments which are generally used in the industrial field. In addition, the facility may be economically operated, and the operation cost is minimized, and an easier maintenance is implemented. In particular, since a bi-directional inverter is adapted, an electrical energy may be restored, for thereby minimizing a power loss.

As described above, when selecting the instruments and parts installed in the train, the previously fabricated products are tested for thereby implementing a stability in a power electronic instrument and control instrument and a desired reliability. An economical operation and a low operation cost are implemented. In addition, an easier maintenance is obtained. In addition, a desired safety of a power electronic instrument and control instrument are obtained. An electrical energy may be restored using a bi-directional inverter, so that it is possible to decrease a power loss, and since less heat is generated, it is possible to prevent an increase of temperature.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a facility system for testing a power of a train, a power test facility system of a train, comprising:
   a test bed for engaging a test object;
   a direct current(DC) power facility formed of a converter transformer and a DC power converter;
   an alternating current(AC) power facility formed of a phase balancer, a voltage adjusting transformer, and a power factor improving apparatus;
   a load facility formed of an induction generator and a bi-directional inverter;
   a measuring apparatus for measuring various characteristics of a propulsion apparatus; and
   a control apparatus for controlling a system,
   wherein said measuring apparatus is connected with the test bed, the load facility and the control apparatus; and
   in the case that a power of a train is tested in a DC section, the DC power facility, the control apparatus, and the load facility are separately connected about the test bed, and the control apparatus, the DC power facility and the load facility are connected in series for thereby performing a power test of the propulsion apparatus; and
   in the case that a power of a train is tested in a AC section, the AC power facility, the control apparatus, and the load facility are separately connected about the test bed, and the control apparatus, the AC power facility and the load facility are connected in series for thereby performing a power test of the train.

2. The system of claim 1, wherein in said test facility system, said propulsion apparatus which is a tested unit, the power measuring meter, and the load facility are connected in series, and a traction motor is rotated in a normal direction by a traction power generated by the inverter which is a tested unit, and an induction generator is rotated in a reverse direction by a speed control signal in accordance with a command of the control apparatus, for thereby generating a load force.

3. The system of claim 1, wherein said load inverter of the load facility is a bi-directional inverter, and operates as a generator when the propulsion apparatus is operated in a reverse direction, and a power which is generated based on a .difference between the traction power of the traction motor and a load force which occurs in the induction generator rotating in the reverse direction, is transmitted to the power facility through the load inverter for thereby restoring an electrical energy, and when braking the propulsion apparatus, the load inverter of the same operates a motor, so that an electrical energy of the power facility is used as a driving force which generates a load force.

4. The system of claim 1, wherein in said measuring apparatus, a power meter for measuring an output power of an inverter which is a tested unit, a temperature meter for measuring a temperature the inverter which is a tested unit and the traction motor or induction generator, a driving force meter for measuring a torque and revolution which occur in a rotary shaft connecting the traction motor and the induction generator, and a standard signal processor for processing the measuring result of the power meter and the measuring result of the driving force meter are connected in series.

5. The system of claim 1, wherein in said control apparatus, a personal computer(PC) and a PLC are connected in series, and a traction power command signal is transmitted to the inverter which is a tested unit, and a load force command signal is transmitted to the load inverter based on a result of the measurement of the standard signal processor.

6. A power test facility system which is characterized in that a generator, a motor, an inverter, and a converter which are generally used in an industrial field are tested using a power test facility system of claim 1.

7. A power test method of a train implemented based on a power test facility system of a train of claim 1, comprising the steps of:
   a type test step of an inverter;
   a combination test step combined with a converter and inverter and a traction motor;
   a combination test step combined with a load inverter and an induction generator; and
   a train operation simulation step which is implemented by combining the converter and inverter and the traction motor and combining the load inverter and the induction generator and using a real time simulation software in which a train information and a track information are inputted in real time.

8. The method of claim 7, wherein a test is performed by selecting one from the group comprising a type test step, a combination test step and a train operation simulation test step, or is performed by combining at least two test steps from said group.

9. The method of claim 7, wherein an inverter used in the combination test step and the train operation simulation test step is a bi-directional inverter.

10. The method of claim 7, wherein said type test step and combination test step of a propulsion apparatus includes:
   a step for connecting a tested unit, a peripheral, a power apparatus and a load apparatus;
   a step for connecting a control facility and the tested unit;
   a step for selecting an operation type switch in normal;
   a step for connecting the tested unit recording meter with the measuring point, and setting an input rated voltage;

a step for setting a load inverter and selecting a responsive load;

a step for driving the tested unit and selecting a notch;

a step for selecting a braking power and operating the tested unit;

a step for measuring a breaking force, a waveform and output of each measuring point; and a step for judging and outputting a result and completing the test.

11. The method of claim 8, wherein said train operation simulation test includes:

a step in which it is judged whether a conventional scenario is used with respect to a test or a new scenario is used, and when a new scenario is formed, a test train car is selected, and a train car condition and track signal are selected;

a step for forming a scenario by setting a test event and a test method and storing the formed scenario;

a signal simulation step in which when a conventional scenario is used without newly forming a scenario, a certain scenario is selected, and a test is started;

a step in which whether or not an auto operation is used is judged, in the case of the auto operation, an auto simulation is performed, and when the auto operation is not selected, a master controller key is operated;

a step in which a dynamic simulation is performed through a pulse width modulator(PWM);

a step for controlling a load unit;

a step in which it is judged whether a test end is completed or not, and in the case of the test completion, a test result is evaluated, and a report is prepared, and in the case that the test is not completed, a test result is stored, and the routine is fed back to a signal simulation by monitoring; and a step in which a test report is evaluated, and whether or not a retest is necessary is judged, and when the report is satisfactory, a system is completed, and when the report is not satisfactory, it is judged whether or not the simulation test is necessary, and the routine is fed back to the first step, and a scenario is formed for thereby starting a test.

12. The method of claim 11, wherein said dynamic simulation includes:

a step for inputting and storing a traction force characteristic of a train and a computation formula of a train running resistance;

a step for initializing a velocity and position of a train;

a step in which an initialization state is judged, when the initialization is performed, a state of a train such as a position and velocity of a train is read;

a step for computing a train resistance using a slope and curve of a running track of a train;

a step for inputting and reading traction power, braking power and command and computing the same;

a step for computing a revolution speed and angle; and a step for storing a velocity and position data of a train and transferring to the load controller.

\* \* \* \* \*